United States Patent
Komatsu et al.

(10) Patent No.: US 7,903,897 B2
(45) Date of Patent: Mar. 8, 2011

(54) IMAGE PROCESSING APPARATUS

(75) Inventors: Hiroaki Komatsu, Nagano (JP);
Fuminori Takahashi, Nagano (JP);
Takanori Miki, Kanagawa (JP);
Masami Haino, Tokyo (JP)

(73) Assignees: Eastman Kodak Company, Rochester, NY (US); Nitto Kogaku KK

( * ) Notice: Subject to any disclaimer, the term of this patent is extended or adjusted under 35 U.S.C. 154(b) by 1097 days.

(21) Appl. No.: 11/565,769

(22) Filed: Dec. 1, 2006

(65) Prior Publication Data

US 2008/0025626 A1    Jan. 31, 2008

(30) Foreign Application Priority Data

Jul. 27, 2006    (JP) ................. 2006-204342

(51) Int. Cl.
*G06K 9/00*    (2006.01)
*G06K 9/40*    (2006.01)
*G06K 1/00*    (2006.01)
*H04N 5/225*    (2006.01)
*H04N 5/228*    (2006.01)
*H04N 9/73*    (2006.01)
*H04N 5/217*    (2006.01)
*H04N 9/64*    (2006.01)
*H04N 1/60*    (2006.01)
*G06F 15/00*    (2006.01)
*G03F 3/08*    (2006.01)

(52) U.S. Cl. ............... 382/254; 382/162; 348/207.1; 348/208.4; 348/224.1; 348/241; 348/248; 358/1.9; 358/518

(58) Field of Classification Search .......... 382/254–255, 382/162, 167, 260–266, 274–276; 348/208.99–208.16, 207.99, 207.1, 207.11, 348/208.1–208.13, 222.1, 224.1, 241, 248–250; 358/1.1, 1.9, 3.21–3.26, 518–519, 523
See application file for complete search history.

(56) References Cited

U.S. PATENT DOCUMENTS 5,444,509 A    8/1995    Ohishi
(Continued)

FOREIGN PATENT DOCUMENTS

JP    6317824    11/1994
(Continued)

OTHER PUBLICATIONS

Biemond et al., "Iterative Methods for Image Deblurring", Proceedings of the IEEE, vol. 78, No. 5, pp. 856-883, May 1990.*

*Primary Examiner* — Vu Le
*Assistant Examiner* — Nathan Bloom
(74) *Attorney, Agent, or Firm* — Thomas J. Strouse; Peyton C. Watkins

(57) ABSTRACT

Apparatus includes a change operator for detecting change factor information which causes the deterioration in the image; an iterative processing operator which iterates a processing cycle comprising; a first processing step to apply a first calculation to a first image utilizing the change factor information to generate a second image, calculating difference data between the deteriorated image and the second image; a second processing step to apply a second calculation to the second image utilizing the difference data to generate a third image; and a replacing step to replace the first image with the third image; wherein the processing cycle further includes (a) detecting whether a coincidence exists between the sign of a first difference data and the sign of a second difference data or not, and (b) increasing an absolute value of the difference data utilized in the second processing step when the coincidence is detected in step (a).

5 Claims, 12 Drawing Sheets

U.S. PATENT DOCUMENTS

| | | | | |
|---|---|---|---|---|
| 6,822,758 B1 * | 11/2004 | Morino | | 358/1.9 |
| 7,079,179 B2 * | 7/2006 | Sumitomo et al. | | 348/222.1 |
| 2001/0008418 A1 * | 7/2001 | Yamanaka et al. | | 348/222 |
| 2005/0147313 A1 * | 7/2005 | Gorinevsky | | 382/255 |
| 2005/0259888 A1 * | 11/2005 | Ozluturk | | 382/260 |
| 2005/0270409 A1 * | 12/2005 | Takeuchi | | 348/345 |
| 2007/0098292 A1 * | 5/2007 | Batur | | 382/261 |
| 2007/0165961 A1 * | 7/2007 | Lu | | 382/254 |
| 2007/0236567 A1 * | 10/2007 | Pillman et al. | | 348/143 |
| 2007/0237514 A1 * | 10/2007 | Pillman et al. | | 396/153 |
| 2007/0248330 A1 * | 10/2007 | Pillman et al. | | 386/107 |
| 2008/0002900 A1 * | 1/2008 | Miki et al. | | 382/254 |
| 2009/0147090 A1 * | 6/2009 | Miki | | 348/208.1 |

FOREIGN PATENT DOCUMENTS

JP  11024122  1/1999

* cited by examiner

Fig. 5

| PIXEL | S−1 | S | S+1 | S+2 | S+3 |
|---|---|---|---|---|---|
| INTENSITY DISTRIBUTION | 0.0 | 1.0 | 0.0 | 0.0 | 0.0 |

Fig. 6

| PIXEL | S−3 | S−2 | S−1 | S | S+1 | S+2 | S+3 | S+4 |
|---|---|---|---|---|---|---|---|---|
| IMAGE-CAPTURING RESULT | 120 | 60 | 80 | 100 | 150 | 80 | 120 | 180 |

Fig. 7

| PIXEL | S−1 | S | S+1 | S+2 | S+3 |
|---|---|---|---|---|---|
| INTENSITY DISTRIBUTION | 0 | 0.5 | 0.3 | 0.2 | 0 |

| PIXEL | S-3 | S-2 | S-1 | S | S+1 | S+2 | S+3 | S+4 |
|---|---|---|---|---|---|---|---|---|
| ORIGINAL IMAGE | 120 | 60 | 80 | 100 | 150 | 80 | 120 | 180 |
| S-3 SHAKE | 60 | 36 | 24 | 0 | 0 | 0 | 0 | 0 |
| S-2 SHAKE | 0 | 30 | 18 | 12 | 0 | 0 | 0 | 0 |
| S-1 SHAKE | 0 | 0 | 40 | 24 | 16 | 0 | 0 | 0 |
| S SHAKE | 0 | 0 | 0 | 50 | 30 | 20 | 0 | 0 |
| S+1 SHAKE | 0 | 0 | 0 | 0 | 75 | 45 | 30 | 0 |
| S+2 SHAKE | 0 | 0 | 0 | 0 | 0 | 40 | 24 | 16 |
| S+3 SHAKE | 0 | 0 | 0 | 0 | 0 | 0 | 60 | 36 |
| S+4 SHAKE | 0 | 0 | 0 | 0 | 0 | 0 | 0 | 90 |
| SHAKE IMAGE Img' | 60 | 66 | 82 | 86 | 121 | 105 | 114 | 142 |

Fig. 8

| PIXEL | S-3 | S-2 | S-1 | S | S+1 | S+2 | S+3 | S+4 |
|---|---|---|---|---|---|---|---|---|
| INPUT Io | 60.00 | 66.00 | 82.00 | 86.00 | 121.00 | 105.00 | 114.00 | 142.00 |
| S-3 SHAKE | 30.00 | 18.00 | 12.00 | 0.00 | 0.00 | 0.00 | 0.00 | 0.00 |
| S-2 SHAKE | 0.00 | 33.00 | 19.80 | 13.20 | 0.00 | 0.00 | 0.00 | 0.00 |
| S-1 SHAKE | 0.00 | 0.00 | 41.00 | 24.60 | 16.40 | 0.00 | 0.00 | 0.00 |
| S SHAKE | 0.00 | 0.00 | 0.00 | 43.00 | 25.80 | 17.20 | 0.00 | 0.00 |
| S+1 SHAKE | 0.00 | 0.00 | 0.00 | 0.00 | 60.50 | 36.30 | 24.20 | 0.00 |
| S+2 SHAKE | 0.00 | 0.00 | 0.00 | 0.00 | 0.00 | 52.50 | 31.50 | 21.00 |
| S+3 SHAKE | 0.00 | 0.00 | 0.00 | 0.00 | 0.00 | 0.00 | 57.00 | 34.20 |
| S+4 SHAKE | 0.00 | 0.00 | 0.00 | 0.00 | 0.00 | 0.00 | 0.00 | 71.00 |
| OUTPUT Io' | 30.00 | 51.00 | 72.80 | 80.80 | 102.70 | 106.00 | 112.70 | 126.20 |
| SHAKE IMAGE Img' | 60.00 | 66.00 | 82.00 | 86.00 | 121.00 | 105.00 | 114.00 | 142.00 |
| DIFFERENCE δ | 30.00 | 15.00 | 9.20 | 5.20 | 18.30 | -1.00 | 1.30 | 15.80 |

Fig. 9

| PIXEL | S-3 | S-2 | S-1 | S | S+1 | S+2 | S+3 | S+4 |
|---|---|---|---|---|---|---|---|---|
| DIFFERENCE δ | 30.00 | 15.00 | 9.20 | 5.20 | 18.30 | -1.00 | 1.30 | 15.80 |
| S-3 DISTRIBUTION | 15.00 | 0.00 | 0.00 | 0.00 | 0.00 | 0.00 | 0.00 | 0.00 |
| S-2 DISTRIBUTION | 4.50 | 7.50 | 0.00 | 0.00 | 0.00 | 0.00 | 0.00 | 0.00 |
| S-1 DISTRIBUTION | 1.84 | 2.76 | 4.60 | 0.00 | 0.00 | 0.00 | 0.00 | 0.00 |
| S DISTRIBUTION | 0.00 | 1.04 | 1.56 | 2.60 | 0.00 | 0.00 | 0.00 | 0.00 |
| S+1 DISTRIBUTION | 0.00 | 0.00 | 3.66 | 5.49 | 9.15 | 0.00 | 0.00 | 0.00 |
| S+2 DISTRIBUTION | 0.00 | 0.00 | 0.00 | -0.20 | -0.30 | -0.50 | 0.00 | 0.00 |
| S+3 DISTRIBUTION | 0.00 | 0.00 | 0.00 | 0.00 | 0.26 | 0.39 | 0.65 | 0.00 |
| S+4 DISTRIBUTION | 0.00 | 0.00 | 0.00 | 0.00 | 0.00 | 3.16 | 4.74 | 7.90 |
| AMOUNT OF UPDATE | 21.34 | 11.30 | 9.82 | 7.89 | 9.11 | 3.05 | 5.39 | 7.90 |
| CURRENT INPUT Io | 60.00 | 66.00 | 82.00 | 86.00 | 121.00 | 105.00 | 114.00 | 142.00 |
| NEXT INPUT Io+1 | 81.34 | 77.30 | 91.82 | 93.89 | 130.11 | 108.05 | 119.39 | 149.90 |

Fig. 10

| PIXEL | S-3 | S-2 | S-1 | S | S+1 | S+2 | S+3 | S+4 |
|---|---|---|---|---|---|---|---|---|
| INPUT Io+1 | 81.34 | 77.30 | 91.82 | 93.89 | 130.11 | 108.05 | 119.39 | 149.90 |
| S-3 SHAKE | 40.67 | 24.40 | 16.27 | 0.00 | 0.00 | 0.00 | 0.00 | 0.00 |
| S-2 SHAKE | 0.00 | 38.65 | 23.19 | 15.46 | 0.00 | 0.00 | 0.00 | 0.00 |
| S-1 SHAKE | 0.00 | 0.00 | 45.91 | 27.55 | 18.36 | 0.00 | 0.00 | 0.00 |
| S SHAKE | 0.00 | 0.00 | 0.00 | 46.95 | 28.17 | 18.78 | 0.00 | 0.00 |
| S+1 SHAKE | 0.00 | 0.00 | 0.00 | 0.00 | 65.06 | 39.03 | 26.02 | 0.00 |
| S+2 SHAKE | 0.00 | 0.00 | 0.00 | 0.00 | 0.00 | 54.03 | 32.42 | 21.61 |
| S+3 SHAKE | 0.00 | 0.00 | 0.00 | 0.00 | 0.00 | 0.00 | 59.70 | 35.82 |
| S+4 SHAKE | 0.00 | 0.00 | 0.00 | 0.00 | 0.00 | 0.00 | 0.00 | 74.95 |
| OUTPUT Io' | 40.67 | 63.05 | 85.37 | 89.95 | 111.59 | 111.84 | 118.13 | 132.38 |
| SHAKE IMAGE Img' | 60.00 | 66.00 | 82.00 | 86.00 | 121.00 | 105.00 | 114.00 | 142.00 |
| DIFFERENCE δ | 19.33 | 2.95 | -3.37 | -3.95 | 9.41 | -6.84 | -4.13 | 9.62 |

Fig. 11

| PIXEL | S-3 | S-2 | S-1 | S | S+1 | S+2 | S+3 | S+4 |
|---|---|---|---|---|---|---|---|---|
| DIFFERENCE δ | 19.33 | 2.95 | -3.37 | -3.95 | 9.41 | -6.84 | -4.13 | 9.62 |
| S-3 DISTRIBUTION | 9.67 | 0.00 | 0.00 | 0.00 | 0.00 | 0.00 | 0.00 | 0.00 |
| S-2 DISTRIBUTION | 0.88 | 1.47 | 0.00 | 0.00 | 0.00 | 0.00 | 0.00 | 0.00 |
| S-1 DISTRIBUTION | -0.67 | -1.01 | -1.68 | 0.00 | 0.00 | 0.00 | 0.00 | 0.00 |
| S DISTRIBUTION | 0.00 | -0.79 | -1.19 | -1.98 | 0.00 | 0.00 | 0.00 | 0.00 |
| S+1 DISTRIBUTION | 0.00 | 0.00 | 1.88 | 2.82 | 4.71 | 0.00 | 0.00 | 0.00 |
| S+2 DISTRIBUTION | 0.00 | 0.00 | 0.00 | -1.37 | -2.05 | -3.42 | 0.00 | 0.00 |
| S+3 DISTRIBUTION | 0.00 | 0.00 | 0.00 | 0.00 | -0.83 | -1.24 | -2.07 | 0.00 |
| S+4 DISTRIBUTION | 0.00 | 0.00 | 0.00 | 0.00 | 0.00 | 1.92 | 2.89 | 4.81 |
| AMOUNT OF UPDATE | 9.88 | -0.33 | -0.99 | -0.52 | 1.83 | -2.73 | 0.82 | 4.81 |
| CURRENT INPUT Io+1 | 81.34 | 77.30 | 91.82 | 93.89 | 130.11 | 108.05 | 119.39 | 149.90 |
| NEXT INPUT Io+2 | 91.22 | 76.97 | 90.83 | 93.37 | 131.94 | 105.32 | 120.21 | 154.71 |

Fig. 12

| PIXEL | S-3 | S-2 | S-1 | S | S+1 | S+2 | S+3 | S+4 |
|---|---|---|---|---|---|---|---|---|
| DIFFERENCE δ | 19.33 | 2.95 | -3.37 | -3.95 | 9.41 | -6.84 | -4.13 | 9.62 |
| S-3 DISTRIBUTION | 9.67 | 0.00 | 0.00 | 0.00 | 0.00 | 0.00 | 0.00 | 0.00 |
| S-2 DISTRIBUTION | 0.88 | 1.47 | 0.00 | 0.00 | 0.00 | 0.00 | 0.00 | 0.00 |
| S-1 DISTRIBUTION | -0.67 | -1.01 | -1.68 | 0.00 | 0.00 | 0.00 | 0.00 | 0.00 |
| S DISTRIBUTION | 0.00 | -0.79 | -1.19 | -1.98 | 0.00 | 0.00 | 0.00 | 0.00 |
| S+1 DISTRIBUTION | 0.00 | 0.00 | 1.88 | 2.82 | 4.71 | 0.00 | 0.00 | 0.00 |
| S+2 DISTRIBUTION | 0.00 | 0.00 | 0.00 | -1.37 | -2.05 | -3.42 | 0.00 | 0.00 |
| S+3 DISTRIBUTION | 0.00 | 0.00 | 0.00 | 0.00 | -0.83 | -1.24 | -2.07 | 0.00 |
| S+4 DISTRIBUTION | 0.00 | 0.00 | 0.00 | 0.00 | 0.00 | 1.92 | 2.89 | 4.81 |
| AMOUNT OF UPDATE | 9.88 | -0.33 | -0.99 | -0.52 | 1.83 | -2.73 | 0.82 | 4.81 |
| AMOUNT OF PREVIOUS UPDATE | 21.34 | 11.30 | 9.82 | 7.89 | 9.11 | 3.05 | 5.39 | 7.90 |
| AMOUNT OF CORRECTED UPDATE | 27.74 | -0.03 | -0.10 | -0.05 | 11.84 | -0.27 | 7.01 | 10.27 |
| CURRENT INPUT Io+1 | 81.34 | 77.30 | 91.82 | 93.89 | 130.11 | 108.05 | 119.39 | 149.90 |
| NEXT INPUT Io+2 | 109.08 | 77.27 | 91.72 | 93.84 | 141.95 | 107.78 | 126.40 | 160.17 |

Fig. 14

TABLE: DIFFERENCE VALUE ACHIEVED WHEN ACCELERATED PROCESSING IS PERFORMED

| NUMBER OF REPETITION OPERATIONS | DIFFERENCE δ PER PIXEL | | | | | | | | TOTAL DIFFERENCE |
|---|---|---|---|---|---|---|---|---|---|
| | S-3 | S-2 | S-1 | S | S+1 | S+2 | S+3 | S+4 | |
| 1 | 30.0000 | 15.0000 | 9.2000 | 5.2000 | 18.3000 | -1.0000 | 1.3000 | 15.8000 | 93.8000 |
| 2 | 19.3300 | 2.9480 | -3.3680 | -3.9510 | 9.4140 | -6.8360 | -4.1320 | 9.6230 | 23.0280 |
| 3 | 5.4590 | -5.3583 | -8.8573 | -3.8889 | 3.5278 | -10.2419 | -9.9221 | 2.4406 | -26.8411 |
| 4 | 5.4915 | -1.3646 | -3.2814 | 1.5152 | 6.1082 | -4.4340 | -6.6771 | -2.1296 | -4.7719 |
| 5 | 5.4882 | 3.7999 | -0.1847 | 3.4955 | 6.0400 | 1.9521 | -0.2404 | 2.0468 | 22.3974 |
| 6 | 2.9876 | 2.1723 | -2.6680 | 0.0329 | 1.6243 | -0.5281 | -1.2294 | 2.0004 | 4.3920 |
| 7 | -0.2632 | 0.0318 | -4.0324 | -3.3510 | -3.3646 | -3.6603 | -2.4255 | 1.3544 | -15.7108 |
| 8 | -0.2168 | 0.0786 | -1.6011 | -1.7317 | -2.1383 | -2.0075 | -0.9441 | 1.4183 | -7.1425 |
| 9 | -0.1565 | 0.6266 | 1.8519 | 1.5868 | 1.0640 | 1.1467 | 1.3805 | 1.5014 | 9.0015 |
| 10 | -0.1625 | 0.5718 | 1.7381 | 1.4508 | 0.9339 | 1.0209 | 1.2617 | 0.0131 | 6.8278 |
| 11 | -0.4471 | -0.3123 | 0.2270 | -0.2024 | -0.5922 | -0.2731 | 0.2348 | -2.3232 | -3.6886 |
| 12 | -0.4335 | -0.2977 | 0.2396 | -0.1812 | -0.5643 | -0.2300 | 0.2863 | -2.2371 | -3.4180 |
| 13 | -0.2657 | -0.1235 | 0.3817 | 0.0656 | -0.2417 | 0.2739 | 0.8917 | -1.1802 | -0.1981 |
| 14 | -0.0476 | 0.0042 | 0.4639 | 0.0617 | -0.2503 | 0.2610 | 0.8793 | -0.2412 | 1.1309 |
| 15 | -0.0511 | -0.0978 | 0.2723 | -0.0616 | -0.3894 | -0.0163 | 0.4721 | 0.7543 | 0.8826 |
| 16 | -0.0511 | -0.0988 | 0.2698 | -0.0627 | -0.3846 | -0.3054 | -0.0117 | 0.4323 | -0.2121 |
| 17 | -0.0511 | -0.1111 | 0.2369 | 0.0522 | -0.1277 | -0.1362 | -0.3386 | 0.0511 | -0.4245 |
| 18 | -0.0511 | -0.1280 | 0.1562 | 0.1787 | 0.1913 | 0.1828 | -0.1720 | -0.0855 | 0.2725 |
| 19 | -0.0511 | -0.1499 | 0.0326 | 0.0945 | 0.1358 | 0.1745 | -0.1024 | -0.0402 | 0.0937 |
| 20 | -0.0511 | -0.1477 | -0.1097 | -0.0707 | -0.0344 | 0.0721 | -0.0529 | 0.0168 | -0.3376 |
| 21 | 0.0086 | -0.0333 | -0.0346 | -0.0352 | -0.0315 | 0.0320 | 0.0452 | 0.0736 | 0.0248 |
| 22 | 0.0862 | 0.1154 | 0.0800 | 0.0324 | -0.0146 | -0.0159 | 0.0110 | 0.0270 | 0.3214 |
| 23 | 0.0815 | 0.1082 | 0.0731 | 0.0288 | -0.0158 | -0.0853 | -0.0394 | -0.0371 | 0.1140 |
| 24 | 0.0244 | 0.0208 | -0.0089 | -0.0088 | 0.0002 | -0.0661 | -0.0252 | -0.0340 | -0.0977 |
| 25 | 0.0136 | 0.0104 | -0.0110 | -0.0076 | 0.0181 | -0.0540 | -0.0162 | -0.0315 | -0.0782 |
| 26 | -0.0005 | -0.0030 | -0.0136 | -0.0060 | 0.0415 | -0.0167 | 0.0185 | -0.0045 | 0.0156 |
| 27 | -0.0003 | -0.0026 | -0.0056 | -0.0012 | 0.0436 | 0.0150 | 0.0370 | 0.0215 | 0.1075 |
| 28 | 0.0010 | 0.0003 | -0.0074 | -0.0126 | 0.0142 | 0.0398 | 0.0372 | 0.0280 | 0.1005 |
| 29 | 0.0028 | 0.0043 | -0.0047 | -0.0243 | -0.0220 | 0.0156 | 0.0036 | 0.0055 | -0.0192 |
| 30 | 0.0027 | 0.0082 | 0.0067 | -0.0165 | -0.0176 | 0.0096 | -0.0276 | -0.0254 | -0.0600 |

Fig. 15

TABLE: DIFFERENCE VALUE ACHIEVED WHEN ACCELERATED PROCESSING IS PERFORMED
DIFFERENCE δ PER PIXEL

| NUMBER OF REPETITION OPERATIONS | S-3 | S-2 | S-1 | S | S+1 | S+2 | S+3 | S+4 | TOTAL DIFFERENCE |
|---|---|---|---|---|---|---|---|---|---|
| 1 | 30.0000 | 15.0000 | 9.2000 | 5.2000 | 18.3000 | -1.0000 | 1.3000 | 15.8000 | 93.8000 |
| 2 | 19.3300 | 2.9480 | -3.3680 | -3.9510 | 9.4140 | -6.8360 | -4.1320 | 9.6230 | 23.0280 |
| 3 | 14.3921 | 0.1486 | -4.7519 | -3.3305 | 8.8520 | -5.9147 | -4.0885 | 7.5176 | 12.8245 |
| 4 | 2.3139 | -6.2366 | -8.7077 | -2.9078 | 2.9896 | -9.4133 | -9.5903 | 1.0339 | -30.5183 |
| 5 | 3.5417 | -2.3439 | -4.0088 | 0.9630 | 6.2708 | -4.2627 | -4.4853 | 3.5963 | -0.7289 |
| 6 | 3.4087 | -1.3327 | -3.1767 | 0.7827 | 5.4302 | -3.4738 | -3.2680 | 3.5979 | 1.9684 |
| 7 | 3.0741 | -0.8020 | -2.7380 | 0.4927 | 4.5763 | -3.0459 | -2.5952 | 3.2644 | 2.2264 |
| 8 | 2.6997 | -0.4647 | -2.3976 | 0.3042 | 3.9068 | -2.6802 | -2.1126 | 2.8735 | 2.1291 |
| 9 | 2.3342 | -0.2386 | -2.1135 | 0.1862 | 3.3722 | -2.3563 | -1.7411 | 2.4932 | 1.9364 |
| 10 | 1.9978 | -0.0824 | -1.8700 | 0.1106 | 2.9319 | -2.0714 | -1.4454 | 2.1470 | 1.7182 |
| 11 | 1.6977 | 0.0276 | -1.6583 | 0.0609 | 2.5611 | -1.8222 | -1.2053 | 1.8418 | 1.5035 |
| 12 | 1.4350 | 0.1057 | -1.4726 | 0.0276 | 2.2441 | -1.6048 | -1.0075 | 1.5773 | 1.3048 |
| 13 | 1.2076 | 0.1610 | -1.3089 | 0.0050 | 1.9706 | -1.4151 | -0.8433 | 1.3500 | 1.1268 |
| 14 | 1.0125 | 0.1995 | -1.1642 | -0.0104 | 1.7331 | -1.2496 | -0.7062 | 1.1556 | 0.9702 |
| 15 | 0.8459 | 0.2253 | -1.0361 | -0.0209 | 1.5262 | -1.1049 | -0.5914 | 0.9897 | 0.8337 |
| 16 | 0.7042 | 0.2415 | -0.9225 | -0.0279 | 1.3454 | -0.9782 | -0.4951 | 0.8483 | 0.7157 |
| 17 | 0.5842 | 0.2503 | -0.8218 | -0.0324 | 1.1872 | -0.8671 | -0.4142 | 0.7277 | 0.6139 |
| 18 | 0.4828 | 0.2534 | -0.7324 | -0.0352 | 1.0486 | -0.7695 | -0.3463 | 0.6249 | 0.5263 |
| 19 | 0.3973 | 0.2521 | -0.6530 | -0.0366 | 0.9269 | -0.6835 | -0.2892 | 0.5371 | 0.4511 |
| 20 | 0.3255 | 0.2476 | -0.5826 | -0.0371 | 0.8202 | -0.6078 | -0.2412 | 0.4621 | 0.3867 |
| 21 | 0.2652 | 0.2406 | -0.5200 | -0.0369 | 0.7263 | -0.5409 | -0.2010 | 0.3979 | 0.3314 |
| 22 | 0.2148 | 0.2319 | -0.4643 | -0.0362 | 0.6437 | -0.4818 | -0.1672 | 0.3430 | 0.2840 |
| 23 | 0.1728 | 0.2220 | -0.4148 | -0.0351 | 0.5710 | -0.4294 | -0.1389 | 0.2960 | 0.2434 |
| 24 | 0.1378 | 0.2112 | -0.3708 | -0.0338 | 0.5070 | -0.3831 | -0.1152 | 0.2556 | 0.2086 |
| 25 | 0.1087 | 0.2000 | -0.3316 | -0.0324 | 0.4505 | -0.3420 | -0.0954 | 0.2210 | 0.1788 |
| 26 | 0.0847 | 0.1886 | -0.2967 | -0.0308 | 0.4006 | -0.3055 | -0.0788 | 0.1912 | 0.1533 |
| 27 | 0.0649 | 0.1710 | -0.2656 | -0.0292 | 0.3565 | -0.2730 | -0.0649 | 0.1656 | 0.1315 |
| 28 | 0.0487 | 0.1659 | -0.2379 | -0.0276 | 0.3176 | -0.2441 | -0.0533 | 0.1436 | 0.1127 |
| 29 | 0.0354 | 0.1549 | -0.2132 | -0.0260 | 0.2831 | -0.2185 | -0.0437 | 0.1247 | 0.0967 |
| 30 | 0.0246 | 0.1443 | -0.1911 | -0.0245 | 0.2526 | -0.1956 | -0.0357 | 0.1083 | 0.0830 |

Fig. 16

IMAGE PROCESSING APPARATUS

CROSS REFERENCE TO RELATED APPLICATIONS

This application claims priority to Japanese Patent Application No. 2006-204342 filed on Jul. 27, 2006, which is incorporated herein by reference in its entirety.

FIELD OF THE INVENTION

The present invention relates to an image processing apparatus.

BACKGROUND OF THE INVENTION

As has hitherto been known, when an image is captured by means of an image processing apparatus such as a camera, deterioration sometimes arises in an image. Factors responsible for deterioration of an image include hand shake arising during image-capturing operation, various aberrations of an optical system, distortion of a lens, and the like.

In order to correct hand shake arising in an image-capturing operation, use of a lens actuation system and a circuit processing system has been known. For instance, a system which detects hand shake of a camera and compensates for the hand shake by means of actuating a predetermined lens in synchronism with the thus detected hand shake has hitherto been known as the lens actuation system (see the abstract of Japanese Patent Laid-Open Publication No. Hei 6-317824). Another known circuit processing system detects fluctuations in the optical axis of a camera by means of an angular velocity sensor, acquires from the detected angular velocity or the like a transmission function representing a blur acquired during the image-capturing operation, and subjects the captured image to inverse transformation of the acquired transmission function, to thus restore an image (see the abstract of Japanese Patent Laid-Open Publication No. Hei 11-24122).

Various images other than ordinary captured images, such as X-ray images, microscopic images, and the like, have been known to undergo deterioration or changes because of shake or other reasons.

A camera adopting the hand shake correction described in Japanese Patent Laid-Open Publication No. Hei 6-317824 requires a space for hardware which drives a lens, such as a motor or the like, and becomes bulky. Moreover, such hardware or a drive circuit for driving the hardware is also required, which in turn adds to cost. In the case of correction of hand shake described in Japanese Patent Laid-Open Publication No. Hei 11-24122, the above-described drawbacks are eliminated, but the following problems are presented. Namely, an image is theoretically restored by means of inverse conversion of the acquired transmission function. However, in reality, difficulty is encountered in restoring an image, for the following two reasons.

First, the acquired transmission function is highly susceptible to noise, a shake information error, and the like. By means of these nominal fluctuations, a value may show great variation. Therefore, a corrected image acquired through inverse conversion may be far different from an image captured without hand shake. Thus, the transmission function cannot be actually utilized. Second, when inverse conversion is performed in consideration of noise or the like, there can also be adopted a method for estimating a solution by means of singular value decomposition of a solution to simultaneous equations. However, the volume of calculation used for estimation becomes astronomically huge, and the risk of a failure to solve the equations is high.

SUMMARY OF THE INVENTION

As mentioned above, the present invention provides an image processing apparatus having a realistic circuit processing system which prevents an increase in the size of an apparatus in the case of restoration of an image.

In order to solve the problem, the present invention provides an image processing apparatus comprising:

a processor for restoring a pre-change image, an image which should have been originally captured, or an image approximating the same (hereinafter called an original image) from source image data having undergone a change, such as deterioration, wherein the processor performs at least once:

iterative processing including generation of comparative data from arbitrary image data by utilization of change factor information data pertaining to a factor responsible for a change in an image;

comparison of a source image data, which are an object of comparison, with the comparative data;

generation of restored data by distribution of acquired difference data to the arbitrary image data by utilization of the change factor information data;

use of the restored data in place of the arbitrary image data, to thus iterate analogous processing; and accelerated processing for distributing a first correction value, whose absolute value is larger than that of the difference data, in place of the difference data.

According to the present invention, the original image data are generated by means of generation of only predetermined data. Accordingly, no substantial increase in hardware is entailed, and the apparatus does not become bulky. There is iterated processing for generating comparative data from restored data and comparing the comparative data with source image data which are objects of comparison, to thus gradually acquire restored data close to the original image. Hence, realistic restoration operation is achieved. Therefore, there can be embodied an image processing apparatus which has a circuit processing system realistic for restoration of an image. Moreover, during iterative processing, there is performed at least once accelerated processing for increasing the quantity of distribution based on a difference between the comparative data and the source image data, by means of setting a correction value, so that restoration processing can be speeded up.

In order to solve the problem, another invention provides an image processing apparatus comprising:

a processor for restoring original image data from source image data, and a storage device for storing data, wherein:

the processor performs iterative processing including:

generation of comparative data from arbitrary image data by utilization of change factor information data pertaining to a factor responsible for a change in an image;

comparison of a source image data, which are an object of comparison, with the comparative data;

generation of restored data by distribution of acquired difference data to the arbitrary image data by utilization of the change factor information data, and use of the restored data in place of the arbitrary image data, to thus iterate analogous processing; and accelerated processing for distributing, in place of the difference data, a first correction value whose absolute value is larger than that of N$\delta$ and which has the same sign as that of the N$\delta$, when the difference data (also called P$\delta$) acquired before n−1$^{th}$ processing and the difference data (also called Nδ) acquired in n$^{th}$ processing have the same sign on condition that the number of iterative processing operations is set to "n" ("n" is an integer of two or more), and distributing, in place of the difference data, a second correction value whose absolute value is smaller than that of Nδ and which has the same sign as that of Nδ, when Pδ and Nδ differ from each other in terms of a sign; and further comprising:

processing for storing the first correction value or the second correction value, both of which are acquired in n$^{th}$ processing, into a storage device, performing distribution analogous to distribution in accelerated processing by use of the stored data in place of Pδ at the time of n+1$^{th}$ processing; and sequentially increasing the number of repetitions and sequentially correcting the stored data, to thus iterate distribution analogous to that in accelerated processing.

According to the present invention, the original image data are generated by means of generation of only predetermined data. Accordingly, no substantial increase in hardware is entailed, and the apparatus does not become bulky. There is iterated processing for generating comparative data from restored data and comparing the comparative data with source image data which are objects of comparison, to thus gradually acquire restored data close to the original image. Hence, realistic restoration operation is achieved. Therefore, there can be embodied an image processing apparatus which has a circuit processing system realistic for restoration of an image. Moreover, when a coincidence exists between the sign of Pδ and the sign of Nδ, the difference data δ can be deemed to be acquired in an essentially-stable manner. Accelerated processing for increasing the amount of distribution of a difference by means of the setting of the first correction value is included in iterative processing, to thus accelerate restoration processing. When no coincidence exists between the sign of the Pδ and the sign of the Nδ, the difference data δ are deemed to have become unstable through overall iterative processing. In n$^{th}$ processing, the value used for distribution is minimized by means of setting a second correction value. Thus, there is prevented a problem of a delay in image restoration processing, which would otherwise be caused when a distribution value is set high with dependence on the difference data δ of inappropriate sign.

In addition to the above inventions, another invention provides an image processing apparatus, wherein the processor stops processing when the difference data have become equal to or smaller than a predetermined value or have become smaller than the predetermined value during iterative processing. In a case where this configuration is adopted, processing is terminated even when the difference has not attained zero. Hence, an increase in processing time can be prevented. Moreover, the difference data are set to a predetermined value or less, and hence approximate restored data become closer to the original image that have not yet undergone a change (deterioration or the like). Moreover, when noise or the like has arisen, there is apt to arise a case where the difference cannot attain zero. Even in such a case, processing is not iterated infinitely.

In addition to the above inventions, another invention provides an image processing apparatus, wherein the processor stops processing when the number of repetition has attained a predetermined number during iterative processing. In a case where this configuration is adopted, processing is terminated even when the difference has attained zero or failed to attain zero. Hence, an increase in processing time can be prevented. Moreover, processing is continued until a predetermined number of operations, and hence approximate restored data become closer to the original image that are to be the original for the source image and have not yet undergone a deterioration, or the like. Moreover, when noise or the like has arisen, there is apt to arise in reality a case where the difference cannot attain zero. Even in such a case, processing is not iterated infinitely.

In addition to the above inventions, another invention provides an image processing apparatus, wherein the processor performs processing for stopping processing in a case where the difference data are equal to or smaller than a predetermined value or smaller than a predetermined value when the number of repetition has attained a predetermined number during iterative processing, and for further iterating processing a predetermined number of times when the number of repetition exceeds the predetermined value or is equal to or higher than the same. The image processing apparatus of the present invention performs processing by combination of the number of operations with difference data. Hence, when compared with a case where limitations are merely imposed on the number of processing operations or difference data, processing can achieve a balance between the superior accuracy of restoration of an image and a short processing time.

In addition to the above inventions, another invention provides an image processing apparatus, wherein, at the time of accelerated processing, the processor takes as the first correction value a value which is determined by means of multiplying Pδ or Nδ by a coefficient of greater than one. When this configuration is adopted, the first correction value is set while taking, as a criterion, Pδ or Nδ acquired as difference data. Hence, a more appropriate first correction value can be set.

In addition to the above inventions, another invention provides an image processing apparatus, wherein, at the time of accelerated processing, the processor takes as the second correction value a value which is determined by means of multiplying Nδ or Pδ by a coefficient from −1 to 1. When this configuration is adopted, the second correction value is set while taking, as a criterion, Pδ or Nδ acquired as difference data. Hence, a more appropriate second correction value can be set.

In addition to the above inventions, another invention provides an image processing apparatus, wherein, in accelerated processing, the processor takes as the first correction value a value which is determined by means of multiplying Pδ or Nδ, whichever has the larger absolute value, by a coefficient of greater than one. When this configuration is adopted, the first correction value is set while taking, as a criterion, Pδ or Nδ acquired as difference data. Hence, a more appropriate first correction value can be set. Moreover, the first correction value is set while taking Pδ or Nδ, whichever has the larger absolute value, as a criterion, whereby accelerated processing can be made much faster.

In addition to the above inventions, another invention provides an image processing apparatus, wherein, in accelerated processing, the processor selects Pδ or Nδ, whichever has the smaller absolute value; and takes a value determined by multiplying Nδ by a coefficient from 0 to 1 as the second correction value when Nδ has been selected or a value determined by multiplying Pδ by a coefficient from −1 to 0 as the second correction value when Pδ has been selected. When this configuration is adopted, the second correction value is set while taking, as a criterion, Pδ or Nδ acquired as difference data. Hence, a more appropriate second correction value can be set. Moreover, the second correction value is set while taking Pδ or Nδ, whichever has the smaller absolute value, as a criterion, whereby a value provided for distribution based on the unstable difference data δ can be minimized.

In addition to the above inventions, another invention provides an image processing apparatus, wherein the processor initiates accelerated processing after the value of "n" has assumed 10 or more. When this configuration is adopted, a difference acquired at the outset of iterative processing is usually large. Therefore, the entire restoration processing can be made stable by means of preventing the distribution values from be being set so as to increase the difference.

In addition to the above inventions, another invention provides an image processing apparatus, wherein the processor takes, as an object to be compared with the predetermined value, absolute values of sets of difference data pertaining to a plurality of pixels forming the image; the difference data; a total sum of the sets of difference data pertaining to the respective pixels; a total sum of the absolute values of the sets of difference data pertaining to the respective pixels; or two or more thereof. When this configuration is adopted, a value to be compared with a predetermined value can be selected, as required, and hence appropriate processing can be performed according to the type of a source image, the state of a change, or the state of restoring operation The present invention enables provision of an image processing apparatus having a realistic circuit processing system which prevents an increase in the size of an apparatus at the time of restoration of an image.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein:

FIG. 5 is a view for specifically describing the processing method shown in FIG. 3 by means of taking hand shake as an example, showing concentration of energy when there is no hand shake;

FIG. 6 is a view for specifically describing the processing method shown in FIG. 3 by means of taking hand shake as an example, showing image data acquired when there is no hand shake;

FIG. 7 is a view for specifically describing the processing method shown in FIG. 3 by means of taking hand shake as an example, showing divergence of energy arising when hand shake has occurred;

FIG. 8 is a view for specifically describing the processing method shown in FIG. 3 by means of taking hand shake as an example and a state where comparative data are generated from an arbitrary image;

FIG. 9 is a view for specifically describing the processing method shown in FIG. 3 by means of taking hand shake as an example and a state where difference data are generated by means of comparing comparative data with an original, blurred image that is to become an object of processing;

FIG. 10 is a view for specifically describing the processing method shown in FIG. 3 by means of taking hand shake as an example and a state where data are restored by means of distributing difference data and adding the thus-distributed difference data to an arbitrary image;

FIG. 11 is a view for specifically describing the processing method shown in FIG. 3 by means of taking hand shake as an example and a state where new comparative data are generated from restored data, and comparing an original, blurred image that is to become an object of processing with the comparative data, to thus generate difference data;

FIG. 12 is a view for specifically describing the processing method shown in FIG. 3 by means of taking hand shake as an example and a state where newly-generated difference data are distributed to thus generate newly-constructed data;

FIG. 14 is a view showing a state where data are newly restored when the second iterative processing shown in FIG. 12 is caused to include the accelerated processing shown in FIG. 13;

FIG. 15 is a view showing a total sum of data pertaining to differences among pixels acquired at each time and data pertaining to differences among the pixels, which is acquired when the processing shown in FIG. 13 has been repeated 30 times and after performance of second accelerated processing or subsequent accelerated processing of the present embodiment;

FIG. 16 is a view showing a total sum of data pertaining to differences among pixels acquired at each time and data pertaining to differences among the pixels, which is acquired when the image restoration processing shown in FIG. 3 has been repeated 30 times and after performance of the accelerated processing of the present embodiment.

DETAILED DESCRIPTION OF THE PREFERRED EMBODIMENTS

An image processing apparatus of an embodiment of the present invention will be described hereunder by reference to the drawings. The image processing apparatus is assumed to be a camera for consumer use. However, the present invention can also be applied to monitoring cameras; TV cameras, handy video cameras, equipment of other applications such as endoscopic cameras, microscopes, binoculars, imaging diagnostic systems such as NMR imaging systems, or equipment other than cameras.

Figure 1:
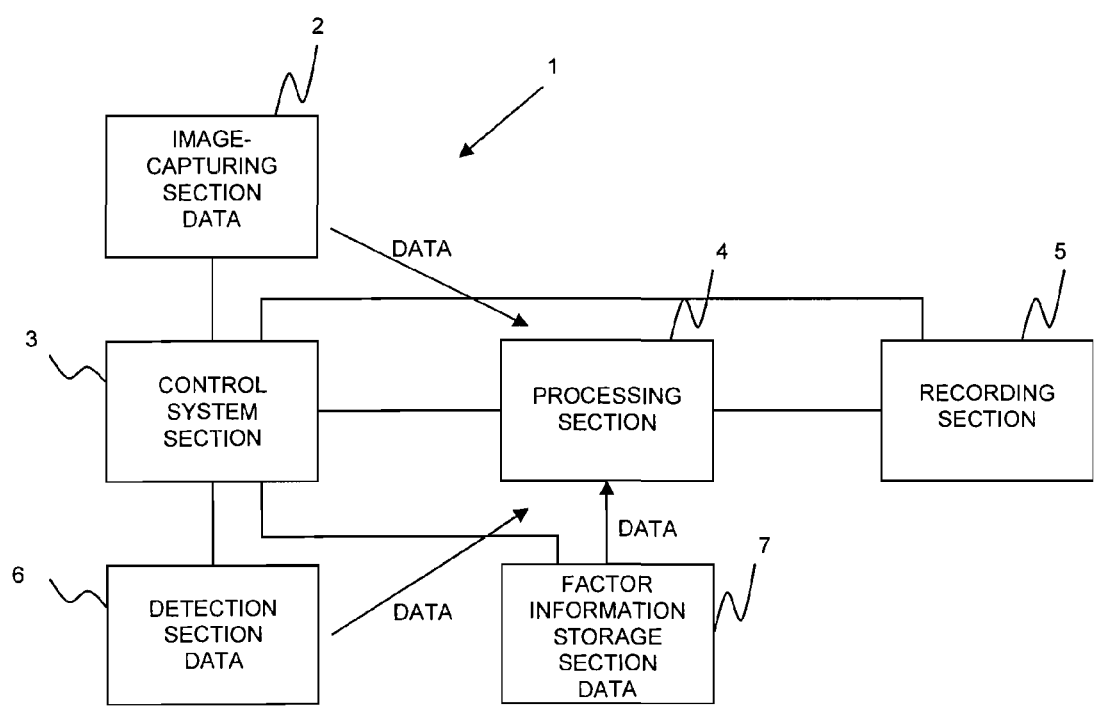
FIG. 1 is a block diagram showing the principal configuration of an image processing apparatus according to an embodiment of the present invention.

FIG. 1 shows the general configuration of an image processing apparatus 1. The image processing apparatus 1 comprises an image-capturing section 2 for capturing an image of a person or the like; a control system section 3 for driving the image-capturing section 2; and a processing section 4 for processing an image captured by the image-capturing section 2. The image processing apparatus 1 of the present embodiment further has a recording section 5 for recording an image processed by the processing section 4; a detection section 6 which is formed from an angular velocity sensor or the like and detects change factor information about a factor responsible for a change such as deterioration in an image; and a factor information storage section 7 for storing known change factor information which induces deterioration in an image or the like.

The image-capturing section 2 is a section having an image-capturing element, such as a CCD, a C-MOS, or the like, which converts into an electrical signal the light having passed through a lens or an image-capturing optical system having a lens. The control system section 3 controls individual sections in the image processing apparatus, such as the image-capturing section 2, the processing section 4, the recording section 5, the detection section 6, the factor information storage section 7, and the like.

The processing section 4 is made up of an image processing processor, and the processor is formed from hardware such as an ASIC (Application Specific Integrated Circuit). The processing section 4 generates a sampling frequency used for detecting vibrations such as hand shake to be detected, and supplies the detection section 6 with the sampling frequency. The processing section 4 also controls the start and end of vibration detection operation.

Further, there may arise a case where the processing section 4 stores image data which are to become a source for generation of comparative data to be described later. Moreover, the processing section 4 may also be formed from software rather than from hardware such as an ASIC. Although the recording section 5 is formed from semiconductor memory, magnetic recording means such as a hard disk drive or the like or optical recording means such as a DVD or the like may also be adopted.

Figure 2:
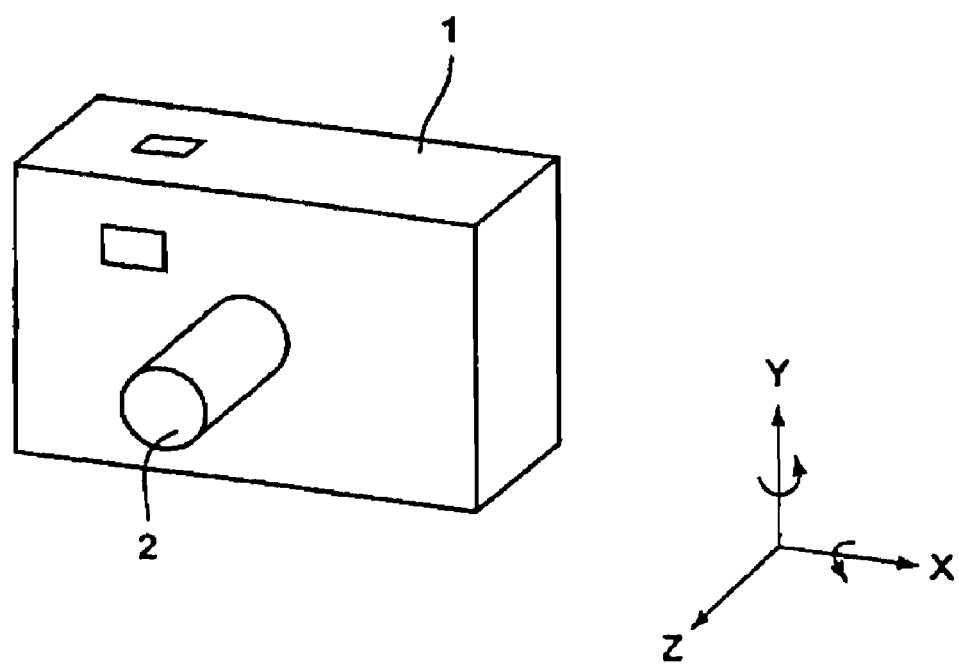
FIG. 2 is an external perspective view showing the overview of the image processing apparatus shown in FIG. 1 and describing the positional layout of an angular velocity sensor.

As shown in FIG. 2, the detection section 6 has two angular velocity sensors for detecting the speed along an X axis and the speed along a Y axis, both of which are perpendicular to a Z axis that is an optical axis of the image processing apparatus 1. Incidentally, hand shake arising when an image is captured with a camera induces movements in the X, Y, and Z directions and pivotal movement about the Z axis. The motions that are most greatly affected by fluctuations are rotation about the Y axis and a rotation about the X axis. Even when these fluctuations are very slight, a captured image exhibits great blurring. Therefore, in the present embodiment, only two angular velocity sensors shown in FIG. 2 are provided, around the X and Y axes. However, in the interest of pursuing perfection, an angular velocity sensor may also be additionally fitted around the Z axis, or a sensor for detecting a movement in the direction X or the direction Y may also be additionally provided. The sensor employed in this apparatus may also be an angular acceleration sensor rather than an angular velocity sensor.

The factor information storage section 7 is a recording section for storing change factor information such as known deterioration factor information or the like; e.g., a point-processing function computed from an aberration of an optical system and/or detected vibration. The point-processing function recorded in the factor information storage section 7 is used by the processing section 4 during, e.g., restoration of an original image [an image which is to be acquired before being changed (hereinafter simply called a "pre-change image"), an image which is originally to be captured, or an image approximating either of these images] from a source image (an image having undergone deterioration, a change, or the like) captured most recently after computation of the point-processing function. A timing when operation for restoring an original image from a source image is to be performed can be determined as a timing which is delayed from the time when the source image has been captured, such as a timing when the power source for image-capturing purpose is deactivated; a timing when the processing section 4 remains inoperative; a timing when the operating rate of the processing section 4 is low; or the like. In such a case, the source image data stored in the recording section 5 and change factor information about the source image stored in the factor information storage section 7, such as a point-processing function or the like, are stored in a mutually-associated manner over a long period of time. As mentioned above, an advantage of delaying the timing when restoration of a source image is performed from the timing when the source image has been captured lies in the ability to lessen the burden of the processing section 4 imposed during image-capturing operation, which entails various processing operations.

The general description of an image restoration method for the processing section 4 of the image processing apparatus 1 of the present embodiment configured mentioned above will now be described by reference to FIG. 3.

Figure 3:
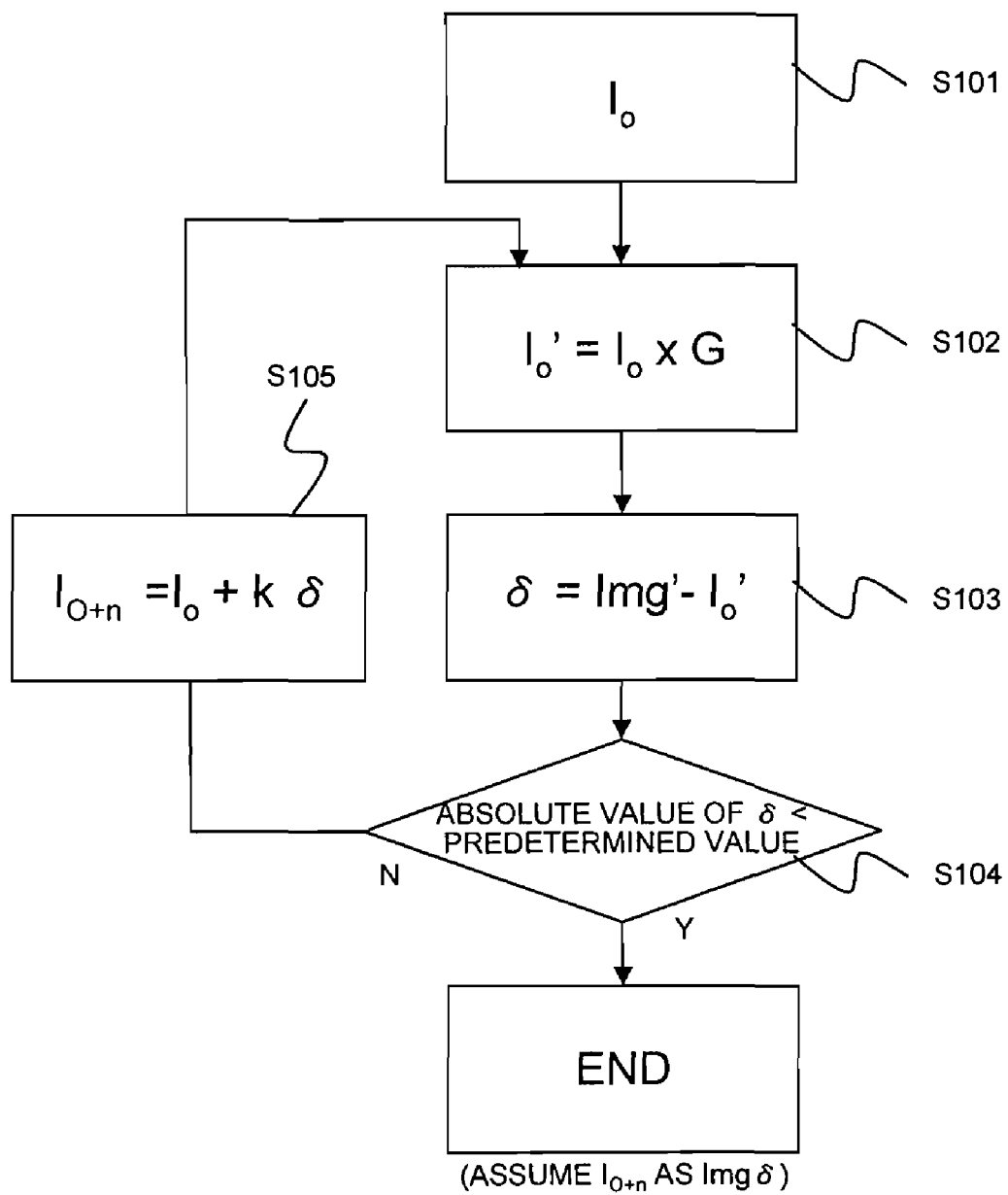
FIG. 3 is a processing flowchart for describing a processing routine pertaining to an image restoration processing method (iterative processing) performed by a processing section of the image processing apparatus shown in FIG. 1.

In FIG. 3, reference symbol Io designates data pertaining to an arbitrary initial image previously stored in the recording section of the processing section 4. Reference symbol Io' designates data which pertain to a deteriorated image of the initial image data Io and which are used for comparison. Reference symbol G denotes data which pertain to change factor information [=deterioration factor information (a point-processing function)] detected by the detection section 6 and are stored in the recording section of the processing section 4. Reference symbol Img' denotes data pertaining to a source image.

Reference symbol δ designates data pertaining to a difference between the source image data Img' and the comparative data Io'. Reference symbol "k" denotes a distribution ratio based on data pertaining to the change factor information. Reference symbol Io+n denotes data pertaining to a restored image (restored data) newly generated by means of distribution of the difference data δ in the initial image data Io on the basis of the change factor information data G. Reference symbol Img denotes original image data. A relationship between Img and Img' is assumed to be expressed by Equation (1) provided below.

$$\text{Img}' = \text{Img} * G \quad (1)$$

Reference symbol "*" denotes an operator representing a convolution integral.

In some cases, the difference data δ may be a simple difference among corresponding pixels. In general, the difference data δ vary according to the change factor information data G and are represented by the following equation (2).

$$\delta = f(\text{Img}', \text{Img}, G) \quad (2)$$

First, in a processing routine of the processing section 4, arbitrary image data Io are prepared (step S101). Data Img' pertaining to a deteriorated source image may also be used as this initial image data Io. Alternatively, any image data, such as solid black, solid white, solid gray, a checkerboard pattern, or the like, may also be used. In step S102, arbitrary image data Io which are to become an initial image are substituted, into Equation (1), in lieu of Img, thereby determining comparative data Io', which are a deteriorated image. Next, the source image data Img' and the comparative data Io' are compared with each other, to thus compute the difference data δ (step S103).

Next, in step S104, a determination is made as to whether or not the absolute value of each of sets of difference data δ among a plurality of pixels forming an image is less than a predetermined value. When the absolute values are greater than or equal to the predetermined value, processing for generating new data pertaining to a restored image (restored data) is performed in step S105. Specifically, the difference data δ are distributed to the arbitrary image data Io on the basis of the change factor information data G, to thus generate new restored data Io+n. Subsequently, processing pertaining to step S102, S103, and S104 is iterated.

In step S104, when the absolute values of the respective sets of data δ pertaining to differences among the pixels are smaller than the predetermined value, iterative processing is terminated. The restored data Io+n acquired at a point in time when iterative processing has been completed are estimated to be the original image data Img. Specifically, when the absolute values of the respective sets of data δ pertaining to the differences among the pixels have become smaller than the predetermined value, the restored data Io+n that have become the source of the comparative data Io+n' become highly analogous to the original image data Img. Therefore, the restored data Io+n are estimated as the original image data Img. The initial image data Io and the change factor information data G may also have be stored in the recording section 5 in advance, and the data may be passed to the processing section 4, as required.

The concept of the above-mentioned iterative processing method is summarized as follows. Specifically, under this processing method, a solution to processing is solved not as an inverse problem but as an optimization problem for determining a reasonable solution. When the solution is solved as an inverse problem, solution of the inverse problem is theoretically possible, but is difficult in practice.

In the present embodiment, when processing is solved as an optimization problem, solution is effected on the premise of the following conditions.

(1) An output in response to an input is uniquely determined.

(2) When an output is the same, an input is the same.

(3) A solution is converged by means of performing iterative processing such that the same output is acquired, while an input is updated.

Figure 4A:
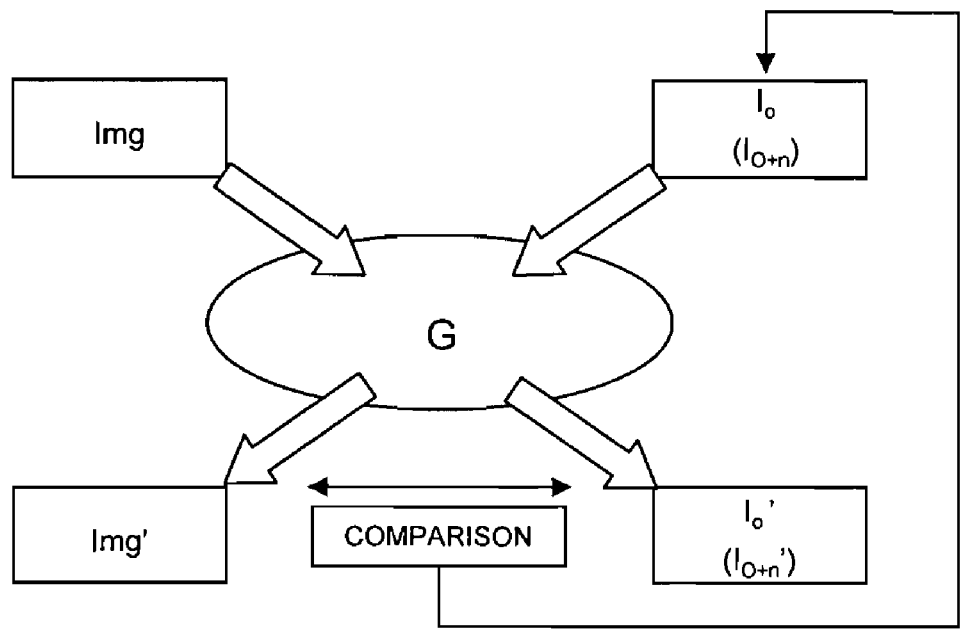
FIG. 4 is a view for describing the concept of the processing method shown in FIG. 3.
Figure 4B:
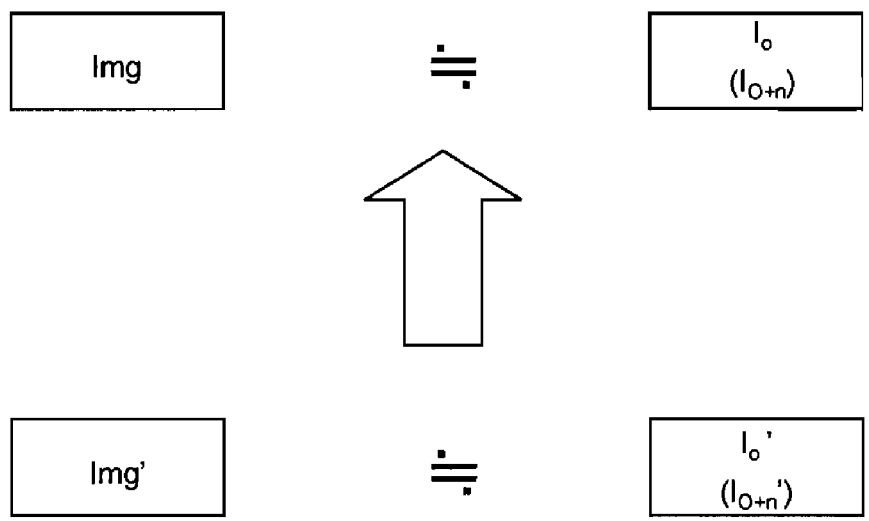

Put another way, as shown in FIGS. 4A and 4B, so long as the comparative data Io' (Io+n') that are analogous to the source image data Img' can be generated, the initial image data Io or the restored data Io+n that are to be original data for generation of the comparative data become analogous to the original image data Img.

In the present embodiment, the sampling frequency of the angular velocity detection sensor is set so as to fall within a range of 60 Hz to 240 Hz. However, an angular velocity may also be detected every 5 μsec so as to be able to detect a high frequency. In the present embodiment, when each set of data is represented in eight bits (0 to 255), the value serving as a criterion for determining the differential data δ is presumed to assume a value of six. When the value is smaller than six; namely, five or less, processing is terminated. Raw data pertaining to shake detected by the angular velocity detection sensor do not correspond to actual shake when calibration of the sensor is insufficient. Therefore, in order to cause the detected shake to correspond to actual shake, when the sensor is not calibrated, the raw data detected by the sensor must be corrected; for example, the raw data are multiplied by a predetermined factor.

Details on the method for restoring hand shake shown in FIG. 3 (iterative processing pertaining to steps S102, S103, S104, and S105) are described by reference to FIGS. 5, 6, 7, 8, 9, 10, 11, and 12.

(Hand Shake Restoration Algorithm)

When there is no hand shake, light energy corresponding to a predetermined pixel converges on that pixel during an exposure time. In contrast, when there is hand shake, light energy is diverged to the pixels having moved during the exposure time. Moreover, when the shake having arisen in the exposure time is ascertained, the manner of divergence of energy during the exposure time is determined. Accordingly, a shake-free image can be generated from a blurred image.

For the sake of simplicity, the following explanations are given in relation to a one-dimensional horizontal direction. Pixels are assigned in sequence from left; namely, S−1, S, S+1, S+2, S+3, . . . , and attention is paid to a certain pixel S. When there is no shake, energy acquired during an exposure time concentrates on the pixel. Hence, the degree of concentration of energy is represented as "1.0." FIG. 5 shows this state. A result of image-capturing operation performed at this time is shown in a table of FIG. 6. Data shown in FIG. 6 become the image data Img to be achieved when no deterioration has arisen in the image. Each of sets of data is expressed as 8-bit data (0 to 255).

It is assumed that shake has arisen during an exposure time; that shake has arisen in the $S^{th}$ pixel for 50% of the exposure time; that shake has arisen in the $S+1^{th}$ pixel during 30% of the exposure time; and that shake has arisen in the $S+2^{th}$ pixel during 20% of the exposure time. The manner of divergence of energy is as illustrated in the table shown in FIG. 7. The data shown in FIG. 7 become the change factor information data G.

Shake is constant across all of the pixels and ascertained as a linear problem. When no upper shake (vertical shake) is assumed have arisen, the state of shake is as provided in a table shown in FIG. 8. Data shown as a "blurred image" in FIG. 8 correspond to the deteriorated source image data Img'. Specifically, 120 of, e.g., S−3 pixel, is diverged as 60 for an S−3 pixel, 36 for an S−2 pixel, and 24 for an S−1 pixel in accordance with a distribution ratio consisting of "10.5," "0.3," and "0.2." Likewise, 60 corresponding to the S−2 pixel data is diverged to 30 for the S−2 pixel, 18 for the S−1 pixels, and 12 for the S pixel. The original image data Img is computed from the deteriorated source image data Img' and the change factor information data G shown in FIG. 7.

Any image data can be adopted as the arbitrary image data Io shown in connection with step S101. However, the source image data Img' acquired in step S100 are used for explanation of adoption of the arbitrary image data Io. Specifically, processing is initiated while there is defined Io=Img'. A label "input" in the table of FIG. 9 corresponds to the initial image data Io. This data Io; namely, Img', and the change factor information data G described in connection with step S102 are subjected to convolution integration. For instance, in relation to 60 of a pixel S−3 of the initial image data Io, 30 is assigned to the pixel S−3; 18 is assigned to the pixel S−2; and 12 is assigned to the pixel S−1. Even in relation to other pixels, data are distributed in the same manner. Thus, the comparative data Io denoted as an output Io' are generated. Therefore, the difference data δ pertaining to step S103 are determined as described in the bottom row in FIG. 9.

Subsequently, the magnitude of the difference data δ is determined in step S104. Specifically, when all of the sets of difference data δ pertaining to the respective pixels have assumed absolute values of less than 0.5, processing is terminated. The difference data δ shown in FIG. 9 do not comply with the above conditions, and hence processing proceeds to step S105. Specifically, the difference data δ are distributed to the arbitrary image data Io by use of the change factor information data G, to thus generate restored data Io+n denoted as a "next input" in FIG. 10. In this case, the restored data correspond to the first data, and hence are expressed as Io+1 in FIG. 10.

In relation to the distribution of the difference data δ, for example, a value of 15, which has been determined by multiplying pixel data 30 of S−3 by 0.5; namely, a proportion ratio of the pixel data 30 (the pixel S−3), is distributed to the pixel S−3. Further, a value of 4.5, which has been determined by multiplying pixel data 0.3 of the S−2 pixel by 0.3; i.e., a proportion ratio of the pixel data 15 of S−2, is distributed to the pixel S−2. A value of 1.84, which has been determined by multiplying pixel data 9.2 of S−1 by a proportion ratio of 0.2 assumed to have been delivered to the S−1 pixel, is distributed to the pixel S−1. The total quantity of data (i.e., the quantity of updated data) distributed to the pixel S−3 attains 21.34. This value is added to the initial image data Io (by use of the source image data Img' in this embodiment), to thus generate restored data Io+1

As shown in FIG. 11, the restored data Io+1 become input image data (=the initial image data Io) in step S102, whereby processing pertaining to S102 is performed. Processing proceeds to step S103, where new difference data δ are generated. The magnitude of the new difference data δ is determined in step S104. When the new difference data are larger than a predetermined value, the new difference data δ are distributed to the previous restored data Io+1 in step S105, thereby generating new restored data Io+2 (see FIG. 12). Subsequently, upon completion of processing pertaining to step S102, new comparative data Io+2' are generated from the restored data Io+2. Thus, after processing pertaining to steps S102, S103 has been performed, processing proceeds to step S104. Processing further proceeds to step S105 by means of the determination rendered in step S104. Such processing is iterated.

As mentioned above, as a result of repetition of processing pertaining to steps S102 to S105, the difference data δ become gradually smaller. When the difference data have become smaller than a predetermined value, shake-free original image data Img are obtained.

Under the previously-described hand shake restoration processing method (iterative processing pertaining to steps S102, S103, S104, and S105) shown in FIG. 3, processing performed by the processing section 4 is formed from software. However, processing may also be embodied by hardware comprising parts which are arranged to perform portions of processing in a sharing manner. Moreover, the change factor information data G include not only deterioration factor information data, but also information used for merely changing a picture or information used for enhancing an image in order to counter deterioration.

When the number of repetitions of processing is automatically or fixedly set by the image processing apparatus 1, the thus-set number of operations may also be altered by means of the change factor information data G. For example, when data pertaining to a certain pixel are distributed over a plurality of pixels because of shake, the number of repetitions of operations is increased. When the data are less dispersed, the number of repetitions of operations may also be decreased.

When the difference data δ diverge during iterative processing or the energy of the image data achieved after movement of energy has become greater rather than smaller, processing may be aborted. In order to determine whether or not the difference data have diverged, there can be adopted a method for determining that the difference data δ diverge when an average of the difference data δ has increased from a previous average. Alternatively, when an attempt is made to change an input to an anomalous value during iterative processing, processing may be aborted. For instance, in the case of eight bits, when a value to be altered exceeds 255, processing is aborted. When an attempt is made to change an input, which is new data, to an anomalous value during iterative processing, the input may be changed to a normal value rather than the anomalous value. For instance, in the case of eight bits (0 to 255), when an attempt is made to input data whose value exceeds 255, processing is performed while the input data are taken as a maximum value of 255.

When restored data, which are to become an output image, are generated, there may arise a case where data extending beyond the area of an image to be restored are generated depending on the change factor information data G. In such a case, the data extending beyond the area are input to an opposite side. When there are data which enter from outside the area, the data are preferably brought from the opposite side. For example, when data assigned to pixels located lower than a pixel XN1 are generated from data pertaining to the pixel XN1 located at the lowermost position in the area, the position comes to the outside of the area. Accordingly, there is performed processing for assigning the data to a pixel X11 which is located immediately above the pixel XN1 and at the topmost position. Similarly, data are assigned to a pixel X12 (adjacent to the pixel X11) which is located immediately above a pixel N2 adjacent to the pixel XN1 and in the topmost position.

There will now be described an embodiment where the speed of iterative processing is accelerated. This embodiment is example accelerated processing for increasing, on the basis of a predetermined criterion, the quantity of distribution of the difference data δ acquired from the comparative data Io' and the source image data Img'. This embodiment will be described hereunder by reference to FIGS. 13, 14, 15, 16, and 17.

Figure 13:
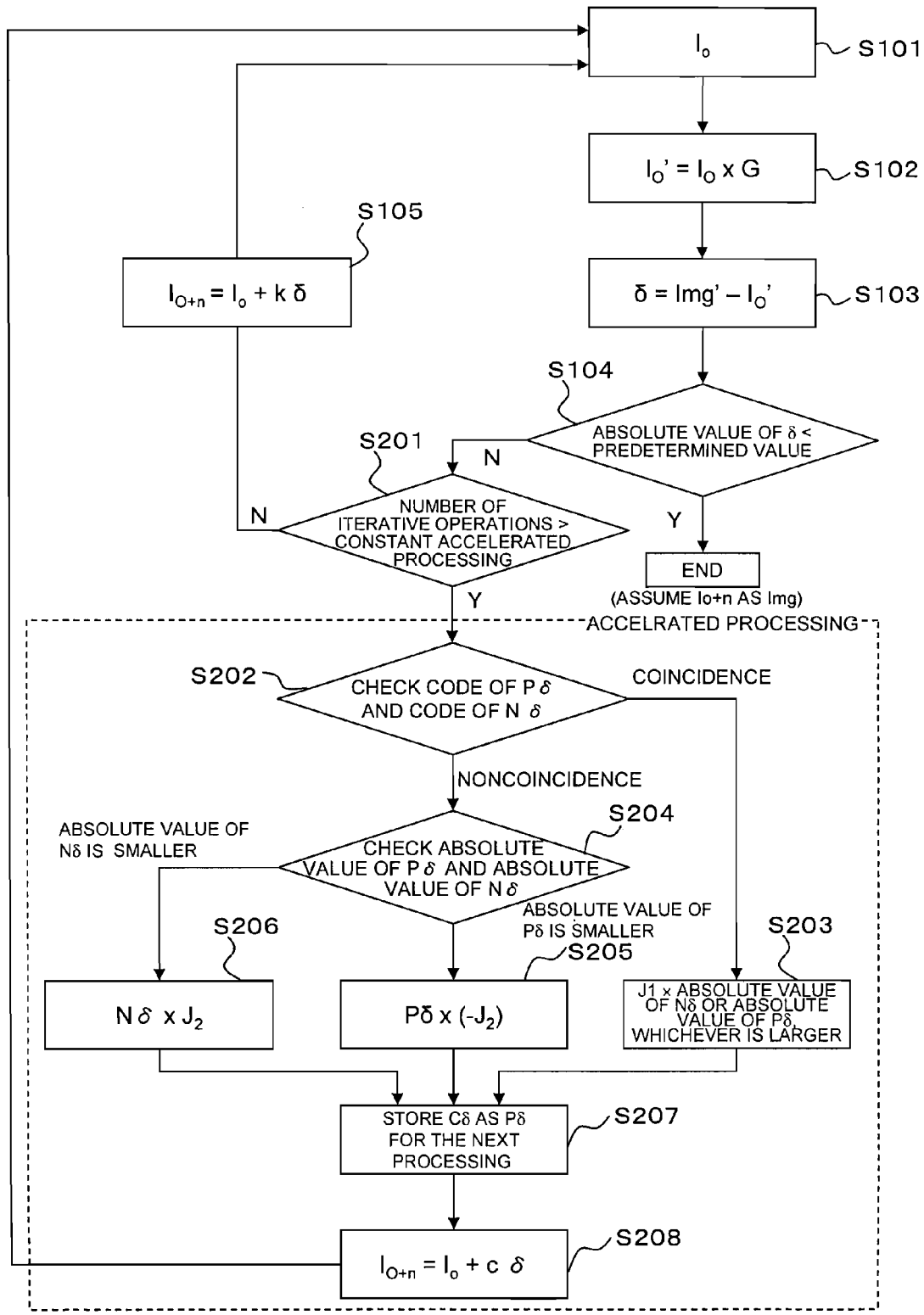
FIG. 13 is a processing flowchart for describing an accelerated processing routine according to the embodiment of the present invention.

FIG. 13 is a processing flowchart employed when accelerated processing is added to the hand shake restoration processing method shown in FIG. 3 (i.e., iterative processing pertaining to steps S102, S103, S104, and S105). Processing operations corresponding to those pertaining to steps S102, S103, S104, and S105 shown in FIG. 3 are assigned the same reference numerals. Reference symbols $J_1$ and $J_2$ are coefficients to be multiplied by the difference data δ during accelerated processing. In the present embodiment, $J_1$ is set to 1.3, and $J_2$ is set to 0.1. Moreover, steps corresponding to accelerated processing are enclosed with a dotted line.

Step S201 is a stage where the value of the difference data δ is large and the original image data Img cannot yet be said to have been acquired. In this step, when the number of repetitions of repeated processing pertaining to steps S102, S103, S104, and S105 has exceeded a predetermined value (a constant), processing proceeds to accelerated processing. A difference acquired at the outset of iterative processing is usually large. Therefore, the entire restoration processing can be made stable by means of preventing the distribution values from being set so as to increase the difference. However, in the present embodiment, the constant is set to one, and accelerated processing is included in second and subsequent iterative processing. Specifics of second iterative processing are primarily described.

Step S202 is a stage where the sign of a difference Pδ acquired through first processing and the sign of a difference Nδ acquired through second processing are ascertained (i.e., the signs are determined to be positive or negative). In the course of the difference data δ gradually approaching zero through iterative processing, there is a case where the difference data δ change while maintaining a positive or negative value and a case where the difference data δ change while transforming one or more times from a positive value to a negative value or from a negative value to a positive value. The reason for this is that, when the difference data δ pertaining to a certain pixel have attained a negative value, a negative value is distributed to an adjacent pixel at the time of distribution of the difference data δ even when the pixel energy of the adjacent pixel is a positive value. For instance, the difference data δ of the pixel S+2 in FIG. 9 are determined to be "−1, 0." However, when the data "−1, 0" are distributed as shown in FIG. 10, a negative value is distributed to the pixel S and S+1 whose pixel energy levels are positive values. Thus, the difference data δ pertaining to a certain pixel affect the pixel energies of surrounding pixels. Hence, during the course of iterative processing, the sign of the difference data δ can change.

When in step S202 a coincidence exists between the sign of the difference Pδ and the sign of the difference Nδ, the difference data δ can be deemed to have been acquired in an essentially-stable manner during the course of iterative processing. A coefficient of J1=1.3, which is larger than one, is multiplied by the difference Pδ or the difference Nδ, whichever has the larger absolute value (step S203). Accelerated processing is performed by means of increasing a distribution value through use of a corrected value cδ of the resultantly-acquired difference data δ (steps S207, S208). The reason why the difference Pδ or the difference Nδ, whichever has the larger absolute value, is selected as mentioned above (step S203) is because an attempt is made to further promote accelerated processing by means of increasing the second distribution value; namely, the $n^{th}$ distribution value.

When in step S202 coincidence does not exist between the sign of the difference Pδ and the sign of the difference Nδ, the difference data δ have inverted from a positive sign to a negative sign or from a negative sign to a positive sign. Hence, during the course of iterative processing, the difference data δ are assumed to have become unstable, and an attempt is made to maintain the current state until distribution values, or the like, from the surrounding pixels become stable. A value to be supplied is minimized in second processing; namely, $n^{th}$ processing. While the sign of the amount of distribution acquired in processing of this time is maintained unchanged, processing is caused to proceed to second iterative processing; that is, $n^{th}$ iterative processing. When the sign of the difference Nδ acquired the $n^{th}$ time is different from the sign of the difference Pδ acquired the $n-1^{th}$ time, the difference data δ acquired in overall iterative processing are still unstable. Hence, a value used for distribution is assigned the same sign as that of the obtained difference data δ and is minimized in $n^{th}$ processing in an attempt to make the difference data stable. Thus, there is prevented a delay in image restoration processing, which would otherwise be caused by means of setting a distribution value to a large value on the basis of the difference data δ of an inappropriate sign.

Specifically, a determination is made as to whether the absolute value of the first $(n-1^{th})$ difference Pδ is greater or smaller than the absolute value of the second $(n^{th})$ difference Nδ (step S204). When the difference data Pδ acquired through $n-1^{th}$ iterative processing are smaller, the difference data Pδ are multiplied by a value of $-J2=-0.1$ acquired by multiplication of a coefficient J2 by $-1$ (step S205), thereby obtaining a corrected value cδ of the difference data δ. The sign of the corrected value cδ becomes equal to that of the difference Nδ acquired in the second time (the $n^{th}$ time). This corrected value cδ is handled as the $n+1^{th}$ Pδ (step S207). A determination is made as to whether the absolute value of the first $(n-1^{th})$ difference Pδ is greater or smaller than the absolute value of the second $(n^{th})$ difference Nδ (step S204). When the difference data Nδ acquired through $n^{th}$ iterative processing are smaller, the difference data Nδ are multiplied by a coefficient $J_2$ (=0.1) (step S206), thereby obtaining a corrected value cδ of the difference data δ. This corrected value cδ is handled as the $n+1^{th}$ difference data Pδ (step S207). As mentioned above, the reason why the difference Pδ or the difference Nδ, whichever has the smaller absolute value, is selected (steps S204, S205, and S206) is because the $n^{th}$ distribution value is minimized to thus cause processing to proceed from a state where the difference data δ remain unstable to a state where the difference data become stable, during the course of iterative processing.

This corrected value cδ is set through second $(n^{th})$ processing (step S207). The corrected value cδ is temporarily stored in a storage device provided in the recording section of the processing section 4 until the corrected value is used as Pδ in third $(n+1^{th})$ processing (step S207). Subsequently, the storage device writes a corrected value cδ (step S207) newly set during third $(n+1^{th})$ processing over the corrected value cδ, to thus delete the old corrected value. Rewriting of the corrected value cδ in the storage device is repeated until accelerated processing is completed. When in step S202 a coincidence continually exists between the sign of the difference Pδ and the sign of the difference Nδ, cδ, a first corrected value, attains a value which is determined by cumulative multiplication of a coefficient $J_1$. The distribution value gradually becomes greater, and accelerated processing further proceeds in an accelerated manner. Conversely, when in step S202 a coincidence does not continually exist between the sign of the difference Pδ and the sign of the difference Nδ, cδ, a second corrected value, attains a value which is determined by cumulative multiplication of a coefficient $J_2$. The distribution value gradually becomes smaller; and, during the course of iterative processing, an attempt is made to effect rapid conversion from a state where the difference data δ become unstable to a state where the difference data δ become stable.

FIG. 14 shows the "amount of corrected update" (cδ) which is acquired from the "amount of update" (Nδ) and the "amount of previous update" (Pδ) via accelerated processing shown in FIG. 13 during the course of generation of new restored data in second iterative processing shown in FIG. 12.

Figure 17:
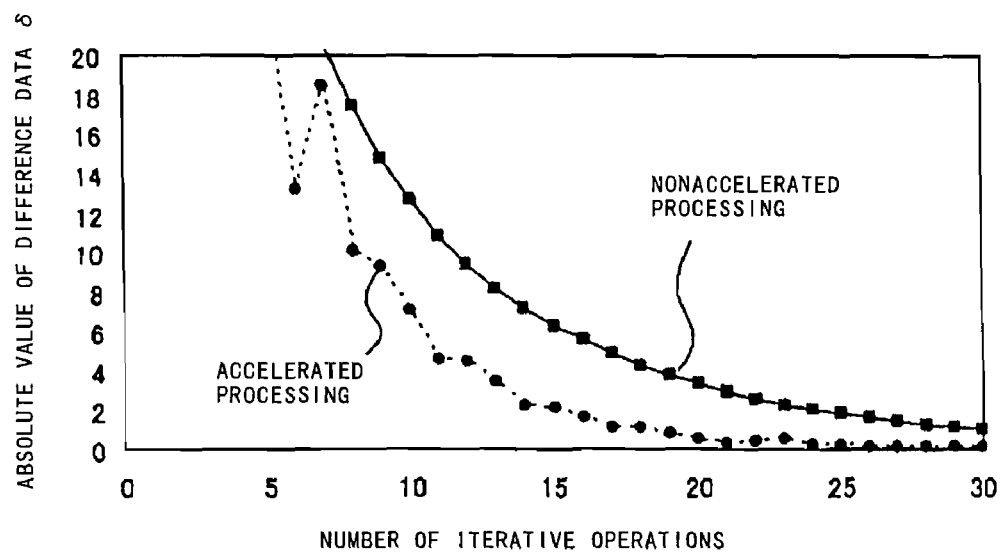
FIG. 17 is a view showing changes in the total sum of absolute values of the data pertaining to the differences among the pixels shown in FIGS. 15 and 16 with reference to the number of iterative processing operations.

FIG. 15 is a table where a total sum of the sets of difference data among the pixels and difference data pertaining to the pixels is displayed after thirty performances of iterative processing including accelerated processing of the present embodiment. FIG. 16 is a table where a total sum of the sets of difference data among the pixels and difference data pertaining to the pixels is displayed after thirty performances of iterative processing shown in FIG. 3 without performance of accelerated processing of the present embodiment. FIG. 17 is a view showing changes in the total sum of absolute values of the data pertaining to the differences among the pixels shown in FIGS. 15 and 16 with an increase in the number of iterative processing operations.

As can be seen from FIGS. 15, 16, and 17, the total sum of absolute values of the sets of difference data δ pertaining to respective pixels is understood to approach zero at a higher speed with an increase in the number of iterative processing operations when accelerated processing is performed rather than when accelerated processing is not performed. For instance, when the number of iterative processing operation performed in a case where accelerated processing is performed is sixteen times, the difference data δ pertaining to the respective pixels all have absolute values of 0.5 or less (FIG. 15). When accelerated processing is not performed and when the number of iterative processing operations has attained 25 times, all of the sets of difference data δ pertaining to the respective elements are understood to assume absolute values of less than 0.5 (FIG. 16).

Although the image processing apparatus 1 of the present embodiment has been described thus far, the present invention may also be carried out in various altered manners without departing from the gist of the present invention. For instance, accelerated processing may also be performed every other iterative processing operation or at intervals of two or more iterative processing operations. Before accelerated processing is initiated, iterative processing may also be performed 10 or more times. Any value falling within a range of e.g., 1.1 to 2.0, can be selected, as required, for the coefficient $J_1$. Moreover, any value falling within a range of, e.g., 0.001 to 0.9, can be selected, as required, for the coefficient $J_2$. The coefficient $J_1$ and/or the coefficient $J_2$ can be changed in accordance with a progress in iterative processing or the difference data δ. For instance, when iterative processing has been performed a predetermined number of times or more, the coefficient $J_1$ may be reduced. When the absolute value of the difference data δ is a predetermined value or more, the coefficient $J_1$ can be increased. Alternatively, when the absolute value of difference data δ is a predetermined value or less, the coefficient $J_1$ can be reduced. The same can also be applied to the coefficient $J_2$.

During processing pertaining to step S203 in FIG. 13, $J_1$ can be multiplied by Pδ or Nδ, whichever has the smaller absolute value. During processing pertaining to steps S204, S205, and S206, Pδ is multiplied by $-J_2$ when the absolute value of Pδ is greater than that of Nδ. Meanwhile, Nδ is multiplied by $J_2$ when the absolute value of Nδ is greater than that of Pδ. When no coincidence exists between the sign of Pδ and the sign of Nδ in step S202 shown in FIG. 13, processing pertaining to step S204 is omitted. Also, processing may proceed to either processing pertaining to step S205 or processing pertaining to step S206.

During accelerated processing of the present embodiment, when the number of iterative operations is taken as "n" ("n" is an integer of two or more), processing shown in FIG. 13 is performed while difference data acquired in the $n-1^{th}$ operation is taken as Pδ and difference data acquired in the $n^{th}$ operation is taken as Nδ. However, Pδ can also be taken as difference data acquired before the $n-1^{th}$ operation.

During iterative processing of the present embodiment, the processing section 4 determines, in step S104 shown in FIGS. 3 and 13, whether or not all the absolute values of the sets of difference data δ acquired for the respective pixels forming an image are equal to or greater than a predetermined value. Alternatively, difference data acquired for each of the plurality of pixels forming an image may also be taken as an object to be compared with a predetermined value, and a determination may also be made on a per-pixel basis as to whether or not iterative processing is halted. Moreover, a total sum of sets of difference data pertaining to respective pixels, a total sum of absolute values of the sets of difference data pertaining to respective pixels, or two of the above-described four objects may also be taken as an object to be compared with a predetermined value. For example, a determination may also be made as to whether or not a value most separated from zero among the sets of difference data δ pertaining to the respective pixels and the total sum of the sets of difference data pertaining to the respective pixels fulfill separate standards. As mentioned above, appropriate processing can be performed according to the type of a source image, the state of a change, or the state of restoring operation, by means of appropriately selecting a value to be compared with a predetermined value.

In the above-mentioned embodiment, image data are taken as objects to be restored. However, the concept and technique of restoration can be applied to restoration of all digital data. For example, the concept and technique can be applied to, e.g., restoration of digital sound data or the like.

The above-described processing method may also be programmed. Alternatively, programmed data may also be stored in a storage medium; e.g., a CD, a DVD, or USB memory, so as to be readable for a computer. In this case, programmed data in a storage medium of the image processing apparatus 1 may be stored in a server outside of the image processing apparatus 1. When necessary, the programmed data may be downloaded for use. In such a case, the image processing apparatus 1 has communications means for downloading a program in the storage medium thereof.

PARTS LIST 1 processing apparatus
2 image-capturing section
3 control section
4 processing section
5 recording section
6 detection section
7 image storage section

The invention claimed is:

1. An image processing apparatus for restoring a deteriorated image comprising:
    a processor performing the following operations:
        a change factor detecting operator for detecting change factor information in the image;
        an iterative processing operator which iterates a processing cycle comprising;
        a first processing step to apply a first calculation to a first image utilizing the change factor information to generate a second image,
        a difference data acquiring step to calculate difference data between the deteriorated image and the second image,
        a second processing step to apply a second calculation to the second image utilizing the difference data to generate a third image, and
        a replacing step to replace the first image with the third image; wherein, the processing cycle further comprises:
        (a) checking the sign of a first difference data acquired by the difference data acquiring step of a present cycle; and
        (b) checking the sign of a second difference data acquired by the difference data acquiring step once cycle before,
        (c) detecting whether a coincidence exists between the sign of the first difference data and the sign of the second difference data or not, and
        (d) increasing an absolute value of the difference data utilized in the second processing step when the coincidence is detected in step (c).

2. An image processing apparatus according to claim 1, wherein the iterative processing operator acquires the deteriorated image as the first image at the beginning of the processing cycle.

3. An image processing apparatus according to claim 2 wherein the processing cycle of step (d) further comprises:
    a first selecting step to compare the absolute value of the first difference data and the absolute value of the second difference data, and to select the larger value, and
    a first multiplying step where the larger value selected in the first selecting step is multiplied by a predetermined coefficient larger than one and utilized as the difference data in the second processing step.

4. An image processing apparatus according to claim 1 further comprising,
    a stabilizing step to decrease an absolute value of the difference data utilized in the second processing step while maintaining the sign of the difference data, when the coincidence is not detected in the coincidence detecting step.

5. An image processing apparatus according to claim 4, wherein the stabilizing step further comprises, a second selecting step to compare the absolute value of the first difference data and the absolute value of the second difference data, and to select the smaller value, and a second multiplying step where the first difference data is multiplied by a predetermined coefficient larger than zero and smaller than one and utilized as the difference data in the second processing step, when the first difference data is selected by the second selecting step and the second difference data is multiplied by a predetermined value larger than minus one (−1) and smaller than zero and utilized as the difference data in the second processing step, when the second difference data is selected by the second selecting step.

* * * * *